US005158579A

United States Patent [19]

Carstensen

[11] Patent Number: 5,158,579

[45] Date of Patent: Oct. 27, 1992

[54] METHOD AND APPARATUS FOR EQUALIZING OF VARIATIONS OF DENSITY IN A STREAMING FLUID

[75] Inventor: Conrad Carstensen, Stavanger, Norway

[73] Assignee: Den Norske Stats Oljeselskap A.S, Stavanger, Norway

[21] Appl. No.: 488,068

[22] PCT Filed: Dec. 15, 1988

[86] PCT No.: PCT/NO88/00093

§ 371 Date: Jun. 21, 1990

§ 102(e) Date: Jun. 21, 1990

[87] PCT Pub. No.: WO89/05940

PCT Pub. Date: Jun. 29, 1989

[30] Foreign Application Priority Data

Dec. 21, 1987 [NO] Norway ................................ 875340

[51] Int. Cl.[5] ............................................. B01D 45/16

[52] U.S. Cl. ......................................... 55/1; 55/459.1

[58] Field of Search ................ 55/1, 459.1, 447, 459.2

[56] References Cited

U.S. PATENT DOCUMENTS 3,155,431 11/1964 Baldwin ......................... 55/459.1 X
4,169,714 10/1979 Calvert .......................... 55/459.1 X
4,344,538 8/1982 Fujisawa et al. .............. 55/459.1 X
4,519,822 5/1985 Hatano et al. ..................... 55/459.1

FOREIGN PATENT DOCUMENTS 2535301 5/1976 Fed. Rep. of Germany .
2451342 1/1978 Fed. Rep. of Germany .
56066 7/1979 Finland .
58-124900 7/1983 Japan .

OTHER PUBLICATIONS

"Drosselstrecken une Wirbeldrossein an Regenbecken", No. 33/34, 1982, pp. 670–674.

*Primary Examiner*—Richard L. Chiesa
*Attorney, Agent, or Firm*—Foley & Lardner

[57] ABSTRACT

The invention relates to a method as well as equipment for smoothing out occurrences of long liquid plugs, so-called slugs, in fluid flows which have more than one phase. The invention is particularly intended for use in transport arrangements for oil and gas, namely multiphase arrangements for the transport of mixtures of oil and gas. The equipment which is used (termed slug catcher) have amongst other things, a vortex chamber (1) and an overlying pressure tank (2) which temporarily stores oil slugs, and portions them out back into the gas flow so that the load on the transport equipment is smoothened out.

18 Claims, 4 Drawing Sheets

METHOD AND APPARATUS FOR EQUALIZING OF VARIATIONS OF DENSITY IN A STREAMING FLUID

The present invention relates to a method for smoothing out varying occurrences of substances with different degrees of density in a fluid flow, and also a construction, which in the following paragraphs is called a slug catcher, for the purpose of carrying out this smoothing out process.

TECHNICAL FIELD

The invention relates to smoothing out a fluid flow which comprises one or more fluids in at least two phases, and where occurrence of one phase can dominate during certain periods of time whilst while the occurrence of another phase can dominate during other periods of time. Fundamentally, concentrations of components are present in different densities in a fluid flow, and it is desirable that the fluid flow is distributed so that the density of the fluid flow becomes relatively uniform.

An example of an area where this technique can be very useful, is in underwater pipelines for the transport of oil and gas. Oil and gas can be present in different phases, but there can also be water, sand particles and other extraneous matter which simultaneously exists in the current flow. The invention is directed towards the objective of distributing components in the current flow so that the mean density does not vary too much and the current flow can pass through pumps, compressors, valves and other equipment without damaging the equipment.

Since the transport of oil and gas is considered to be the most important area for this invention, oil and gas will, in the following paragraphs, be used as an example of two different phases in a fluid flow. This manner of expression is chosen only for practical purposes and is not intended to limit the invention which covers the handling of all types of multiple phase fluids.

The present invention aims at finding a method and equipment for smoothing out the density of the fluid in a transport system for the multiple phase transport of fluids.

Great economic advantages are involved in switching to multiple phase transport of untreated oil and gas since one common transport arrangement is sufficient for the various phases of the oil products. Multiphase process units which can supply increased pressure height for oil and gas of varying mixture proportions already exist. But, there is much to be gained by having a multiphase flow where the distribution of the various phases is as uniform as possible. The efficiency and the reliability of such units are greatly decreased when large variations in the oil/gas relationship have to be accepted. Mechanical strains when long liquid slugs plunge into the system always represent a threat for pumps, motors, compressors and an optional frequency control.

By constructive means, for example diameter optimization, the most serious slug problems will be avoided. But in the case of operational disturbances such as pigging, shut-down or reduction in production, slug formation will occur. The slugs will normally grow until there is a state or equilibrium between friction loss and available differential pressure.

DISCLOSURE OF INVENTION

The object of the present invention is to provide a method and an apparatus for even distribution of a fluid flow, where the above mentioned disadvantages are avoided. It must be particularly mentioned that slug catchers according to the present invention are small in size, and in many embodiments, without electronic or motor-driven auxiliary components, they can lead the slugs back to the fluid flow in a uniform state. All this is achieved by a method or an apparatus according to the invention as described in the following paragraphs.

BRIEF DESCRIPTION OF DRAWINGS

In order to give a clearer understanding of the present invention, reference is made to the following detailed descriptions of examples of embodiments with reference to the accompanying drawings, wherein.

The arrows in the figures indicate flows and flow-directions.

DETAILED DESCRIPTION OF THE PREFERRED EMBODIMENTS

Figure 1:
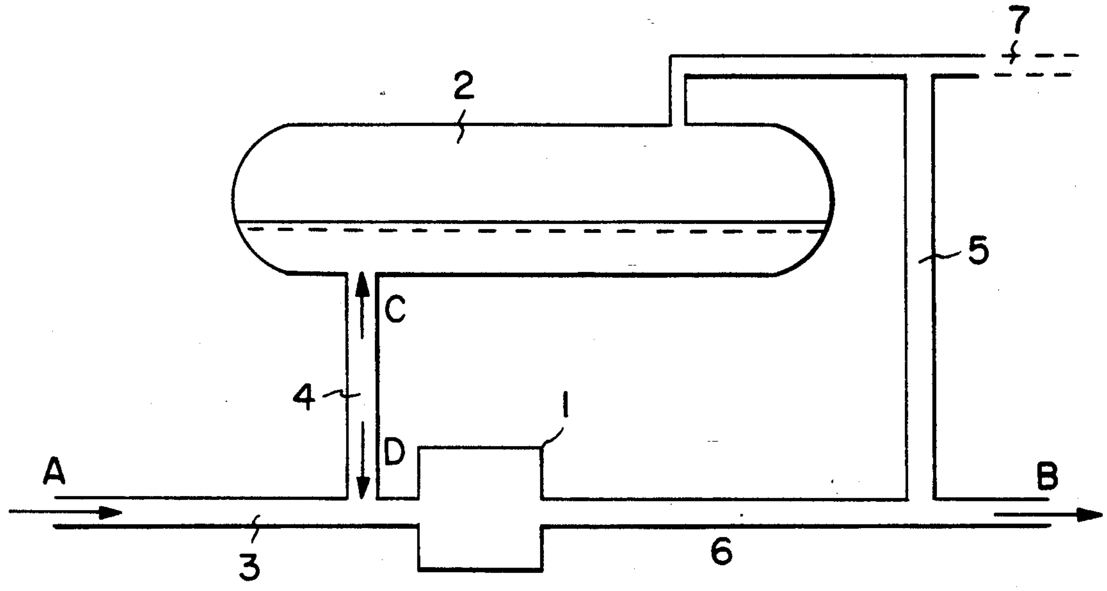
FIG. 1 shows a principle sketch for a so-called slug-catcher according to the present invention.

Let us now look at FIG. 1. Here, a slug catcher according to the invention is shown inserted in a large pipeline arrangement which is indicated only by its connection with respectively, the inlet side A and the outlet side B of the slug catcher.

The fluid flow enters the slug catcher at the arrow A. It flows on through the pipe 6 and arrives at the flow inducing device 1. This device is designed in such a way that it provides greater resistance to the fluid flow A in accordance with how great the density of the fluid is. After the fluid flow has passed through the flow inducing device 1, it leaves the pipe 6 and flows on towards the outlet at the arrow B. Here, the fluid flow escapes further into the external, not shown, pipeline arrangement.

Upstream from the device 1, a riser tube 4 branches off, leading to an overlying collector unit 2. A tube connection 5, which is connected with the pipe 6 near the outlet B of the slug catcher, extends from the collector unit 2. At the uppermost point of the pipeline 5, an optional additional branch 7 is shown.

This slug catcher functions as follows:

If a fluid flow consisting mainly of gas is led into the inlet A of the slug catcher, the flow will continue up to the flow inducing device 1. Since this device does not exhibit any great resistance to a gas flow, the flow will continue quite unimpeded through the pipe 6 to the outlet B of the slug catcher.

If instead the fluid flow consists mainly of liquid, or even of a suspension of solid particles in a liquid phase, and therefore has greater density, the device 1 will then exhibit great resistance to the flow. This resistance will lead to a pressure increase in the liquid flow upstream from the device 1, and thus, some of the liquid flow will be forced up through the pipe 4 to the collecting unit 2, as is indicated by the arrow C. If an elongated liquid plug is present in the flow, that is, a so-called slug, only a small amount of the liquid will manage to press through the device 1 because of its great resistance to the flow. Thus, the greater part of the slug will be pressed up into the collector unit 2 and filling this to a greater or lesser extent.

If the fluid flow at the inlet A should again change character back to a more gaseous phase, the resistance to the fluid flow through the device 1 will decrease, the pressure on the upstream side of the device 1 will accordingly also decrease, and some of the collected liquid slug in the collector 2, under the influence of gravity, will flow down through the pipe 4 and mix with the gas flow as indicated by the arrow D.

A balance will occur between the density of the fluid which at the moment is present in the device 1, and the return from D of the liquid from the collector unit 2, and the final result will be that the fluid flow at the outlet B becomes an evenly distributed mixture of liquid and gas phases.

The principle can be expressed simply like this: Large slugs are stored temporarily in the collector unit 2 and are returned to the fluid flow in small portions when the fluid flow becomes more gaseous.

The idea here is that returning all of the slugs to the fluid flow shall take place through the pipe 4, while the pipe 5 shall always lead gas.

The extra branch 7 of the pipe 5 is not necessary in all embodiments of the invention. It's purpose can be to create an opportunity to empty the collector unit 2 if it should become completely full. If the slug occurrences in the arrangement remain inside the predicted limit values, the collector unit 2 will never become completely full, and the slug catcher will operate continuously and without requiring inspection will even out the density of the fluid flow.

Another and perhaps more relevant use of a branch as shown at 7, is to conduct a more gas-rich portion of the flow from the top of the collector unit 2, separately, to subsequent equipment for more special treatment than is possible in a mixed flow. In certain cases, the pipe connection 5 to the horizontal pipe 6 may not be present, but a connection, as shown by 7, provides attachment of the gas part of the collector unit to additional equipment or pipe arrangements and thus the necessary possibility for expansion in the collector unit.

An important element of this invention is the flow-inducing device 1, and its design. Many different embodiments are available.

Amongst the most simple embodiments, the device 1 can be designed as a restriction in the pipe 6, for example in the form of an adjustable valve. A restriction or valve will provide an increase in the flow resistance by increasing the density of the fluid exactly as desired. Depending on the design of the restriction, a ratio between density and flow resistance can be achieved which varies within wide limits and in different ways. However, purely proportional ratios between flow resistance and fluid density will be most easily achieved with this embodiment, that is, the flow resistance will increase directly in proportion to the density.

In order to achieve a desired distribution of the flow it is also possible to arrange choking or adjustment in the riser tube 4 and/or the connecting pipe 5, for instance in the form of a restriction in the cross section of the flow.

An embodiment of the flow-inducing device which is particularly advantageous, is a vortex chamber. The vortex chamber is a known component in flow arrangements, and is described in literature, for example in the article: "Drosselstrecken und Wirbel-drosseln an Regenbecken" by H. Bromach in the periodical "Schweizur Ingenieur und Architekt" no. 33/34 from 1982, on pages 670–674.

If the vortex chamber is to provide a good solution, the energy potential must be so great that it can release the desired flow characteristics in the vortex chamber. However, the physical size of the vortex chamber does not represent any limitation since the control characteristics become better, as the dimensions of the chamber are larger.

Figure 2:
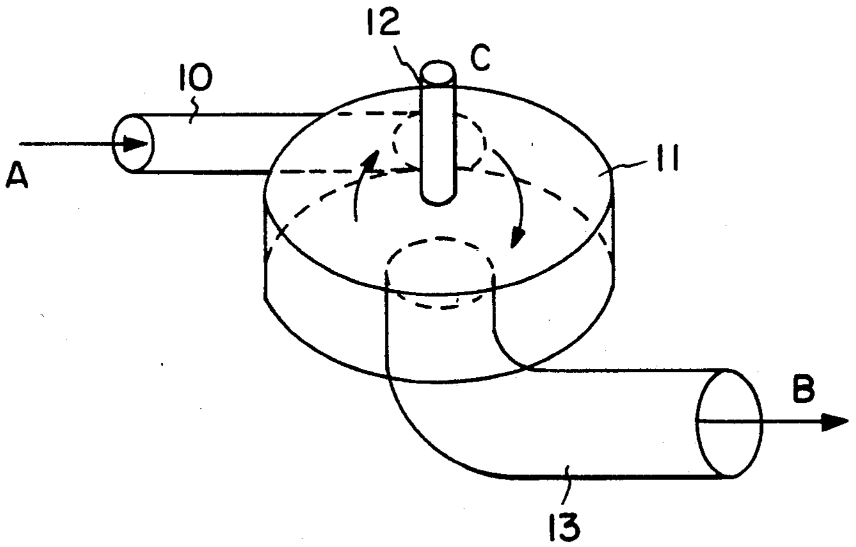
FIG. 2 shows the principle for a vortex chamber utilized as a flow inducing device.

A vortex chamber can be embodied in many ways, but the principal main features are as shown in FIG. 2.

The vortex chamber can be equipped with an inlet 10, a vortex room 11, a riser 12 and an outlet 13.

A vortex chamber functions in principle as explained in the following.

The in-flow takes place through a preferably tangential inlet 10 in the vortex chamber 11 and is preferably at the lowest point when the vortex chamber is mounted in the arrangement. The vortex chamber can be assembled of metal plates or it can be cast as a unit in plastic or another material of appropriate strength. It can also have the possibility of being opened for cleaning and controlling. In the base of the vortex room 11 there is an outlet 13, possible with a variable chokable cross-section (not shown). The vortex chamber is also provided with a riser pipe 12, which is centrally placed at the apex of the vortex room, and an outlet 13 which is placed at the base of the vortex room.

When a fluid flow arrives through the inlet 10 in the vortex chamber, both the velocity and the density of the flow are decisive as to what will happen.

If the fluid flow is small and consists of a lot of gas, a powerful vortex will not form in the chamber. The gas will flow relatively easily through the chamber, and the flow resistance will not be greater than in a smooth pipe. If the fluid flow is sufficiently low, the liquid slugs will also pass through the chamber in the same way. But as mentioned above, it is essential that the energy content of the liquid flow be sufficient if vortex formation is to occur in order to cause the intended effect.

The flow resistance in a vortex chamber can in its first approximation be said to be a linear function of the density of the fluid. The flow in the two branches 4 and 6 will always be distributed in such a way that the resistance in the two possible flow passages will be equally large.

In the case of higher flow velocities, a liquid slug which arrives at inlet A will fill the whole vortex chamber and form a powerful vortex. Thus, the resistance here will increase greatly, and a part of the fluid flow will take the path through the mounted riser tube 12, where the resistance is considerably less, and a jet will squirt into the collecting unit 2. This will force gas from the upper part of the collector unit, which will reach the slug catcher's outlet B through the pipe 5. The amount of liquid which will succeed in forcing itself through the vortex chamber and further into pipe 6, will be small, since the vortex core obstructs the largest part of the outflow cross section. Moreover, the flow inducing device as already mentioned, can consist of a nozzle or restriction for achieving the intended characteristic. However, some liquid will in any case force itself, through the pipe 6 and mix with the gas which flows through the pipe 5, so that the final flow out of the slug catcher, at B, is a mixture of liquid and gas.

As is evident from that which has been explained so far, the final flow out of the slug catcher at B will always be a mixture of liquid and gas in the case of a continuous operation of the arrangement, regardless of whichever mixture is present at the inlet, as long as there is no neat gas phase or neat liquid phase present, and as long as the collector unit 2 does not become completely full or completely empty of liquid. In theory, it is possible to construct the slug catcher so that all occurring mixture ratios on the inlet side can be distributed so that the mixture ratios at the outlet remain within the predetermined limiting values which do not overload the other components of the pipeline arrangement.

One of the reasons why a vortex chamber is so suitable as a flow inducing device in connection with the present invention, is that the chamber ensures a stratified flow where the vortex flow converts pressure height into kinetic energy. As a result of this, a powerful drop in the static pressure against the centre of the vortex room occurs. The energy in this region sinks therefore very slightly. The liquid therefore leaves the vortex chamber at a very great speed, but with hardly any pressure in the form of a rotating annular jet. The degassing also ensures that the vortex core remains pressureless in spite of a build up liquid and increased pressure at the inlet.

In one particular embodiment, it can be particularly advantageous to use a so-called bistable vortex chamber, that is, a vortex chamber where the flow resistance has a low value when density is low, and a rapid change to high flow resistance when density is higher.

Figure 3:
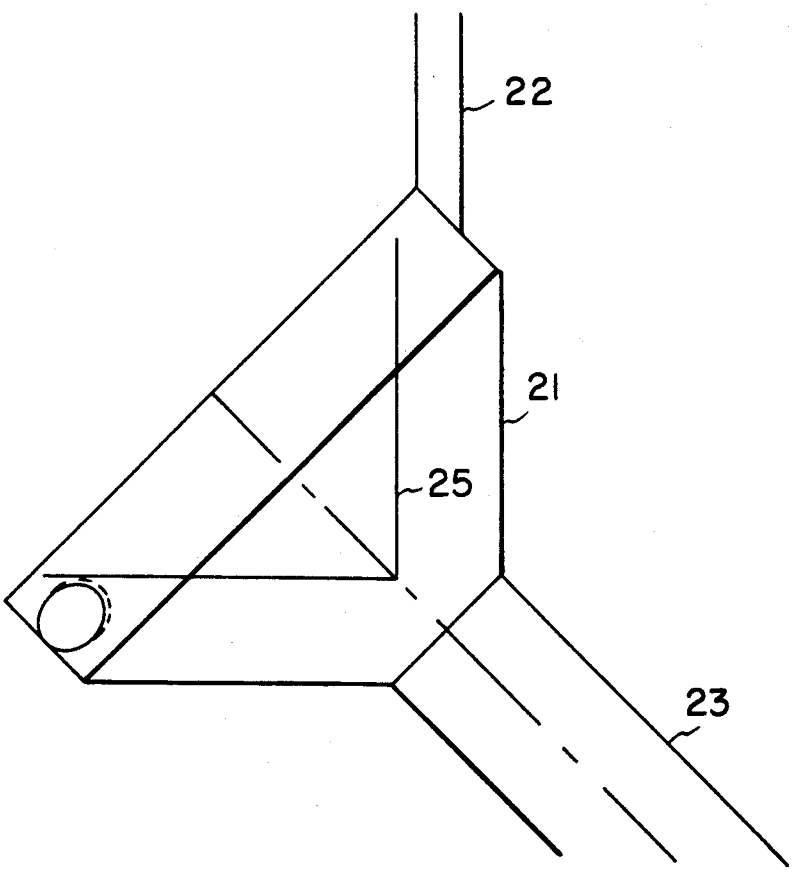
FIG. 3 shows a conical vortex chamber incorporating a conically separating screen. Especially suitable as a flow influencing device in connection with the present invention.

It is also considered advantageous to use a conically designed vortex room 21, possible with an internal cone-formed insertion 25 as indicated in FIG. 3, since this leads to more rapid vortex formations. In this case, the riser pipe 22 must not lead out from the centre of the vortex chamber 21, but from its periphery, as indicated in the figure.

In FIG. 3 there is only shown one pipe 22 between the bistable vortex chamber and the collector unit 2, as a function of the fluid density inside the vortex chamber. In an alternative embodiment (not shown) two pipes can be used, where the fluid in a first pipe flows from the vortex chamber and to the collector unit 2, and in a second pipe returns to the vortex chamber. The fluid flow can be controlled by means of one-way valves or by the inlet for the first pipe, respectively the, outlet for the second pipe, being placed at sites with different pressure in the vortex chamber.

Figure 4:
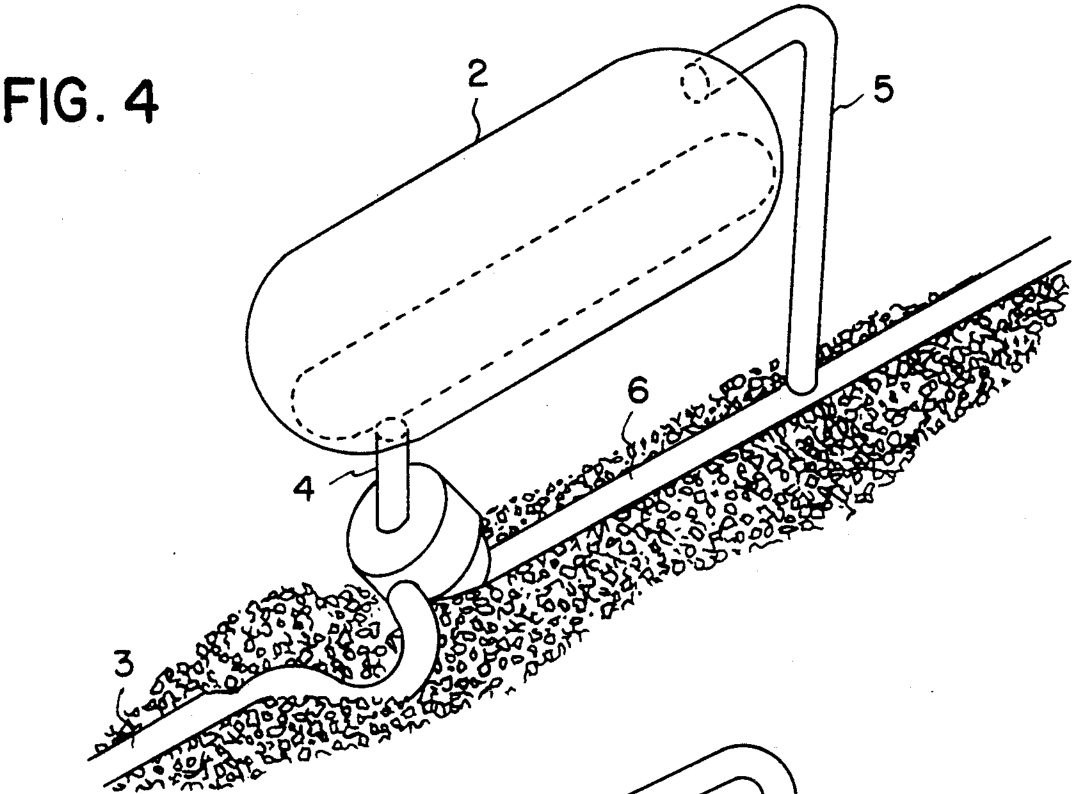
FIG. 4 shows a slug catcher in perspective, designed in accordance with the present invention, comprising a horizontal collector.
Figure 5:
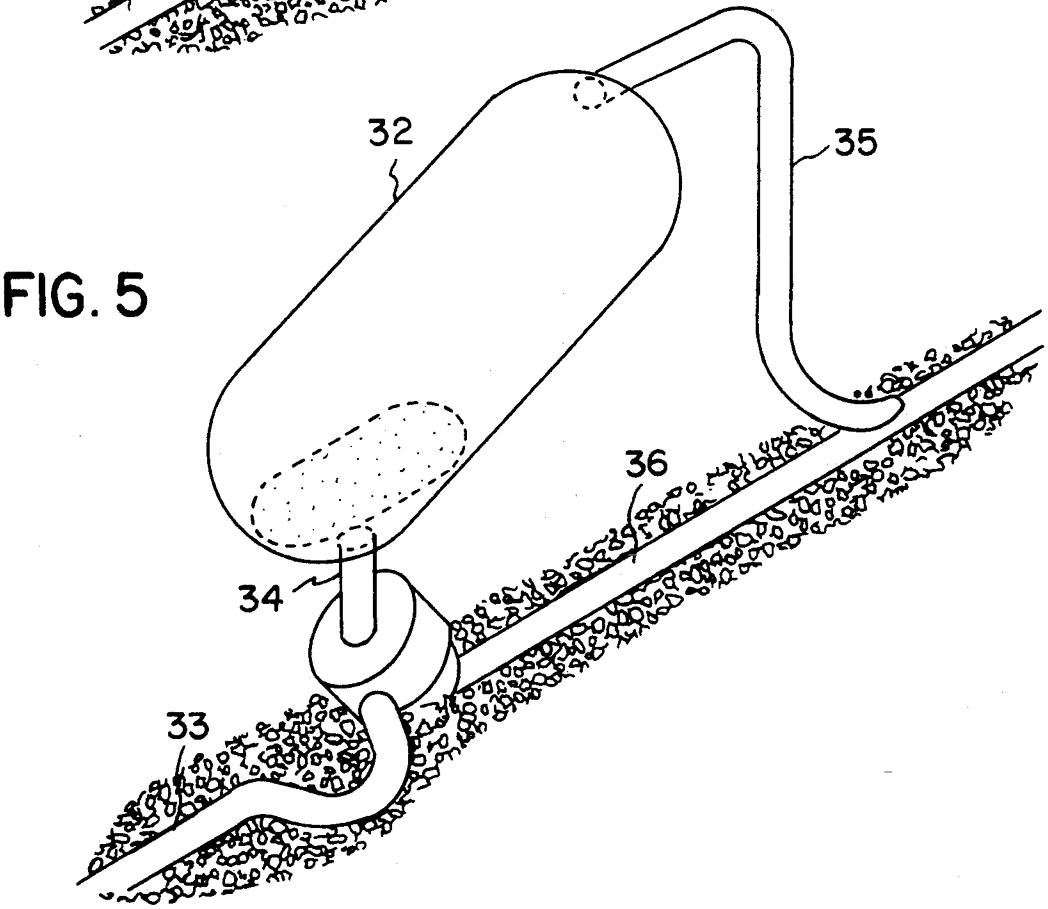
FIG. 5 shows, in perspective, another embodiment of a slug catcher in accordance with the invention, comprising a sloping collector unit.

Further, in FIG. 4 a perspective sketch is shown of a practical embodiment of a slug catcher in accordance with the principle in FIG. 1, with horizontally lying collector unit 2 and T-shaped connecting piece between the pipes 5 and 6. In FIG. 5 a similar arrangement is shown, but here with a sloping collector unit 32 and with Y-shaped connecting piece between the pipes 35 and 36.

Whether the horizontal or sloping collector unit is chosen, or a T or Y piece between the pipes 5 and 6, makes no principal changes in the way of functioning, but will, together with the dimensions of the arrangement, be able to influence the optimum operating conditions. In these figures it is also indicated that a good and stable foundation of the entire pipe arrangement is important for the stability of the system.

Figure 6:
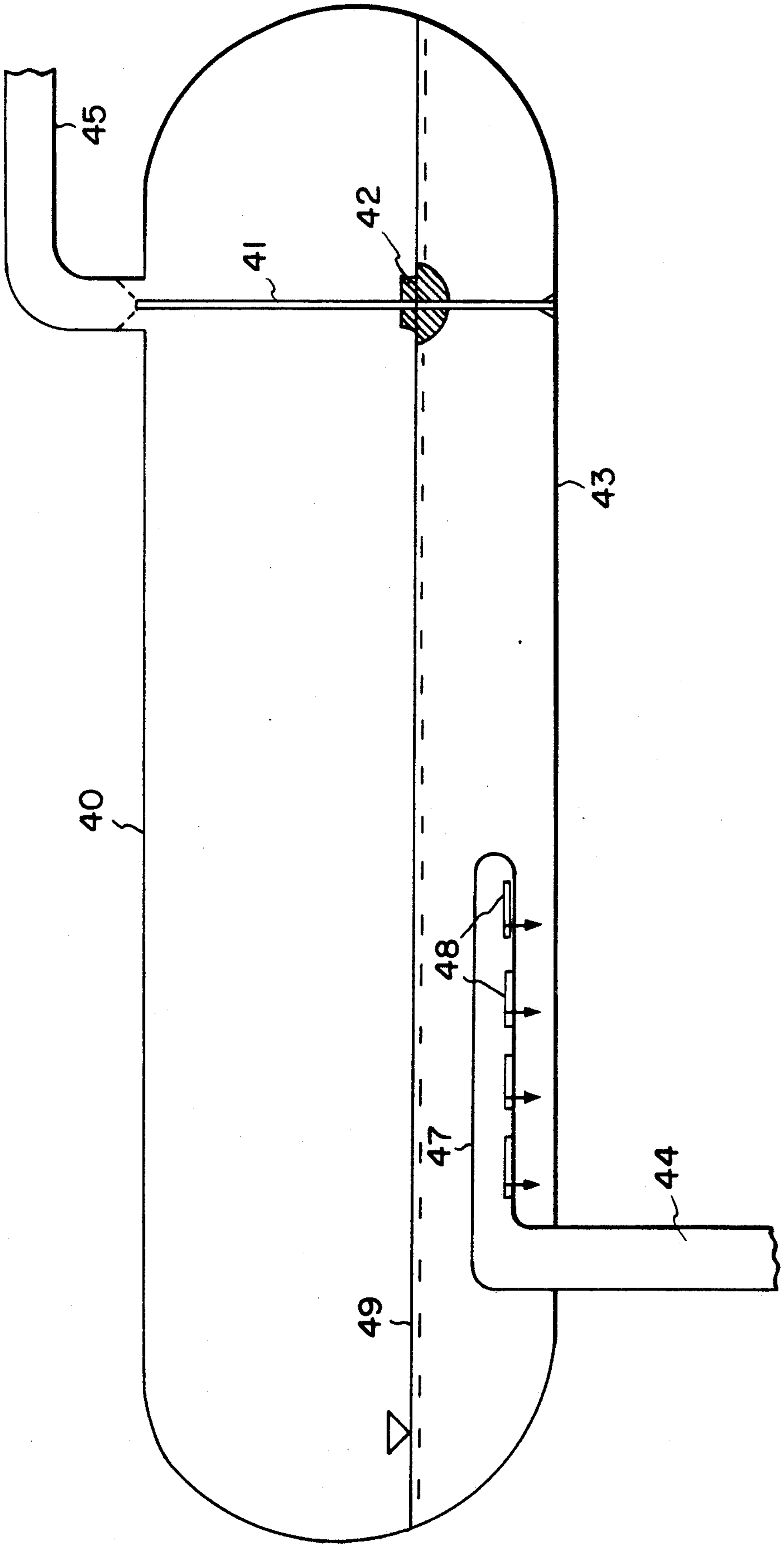
FIG. 6 shows two details in connection with a collector unit or the container which is an integral part of a slug catcher in accordance with the present invention.

Other details can conceivably enter into the slug catcher in accordance with the present invention. Thus, in FIG. 6, a collector unit 40 is shown, which can be equipped with a single floater 42 which is held up by the liquid which is always present in the collector unit. The floater is glidably mounted on a vertical guide pin 41, and is designed so that it will close off the outlet of the pipe 45 when the liquid fills the collector unit 40 to a predetermined level which creates a danger of oil flowing over to the pipe 45.

This floater can also control an alarm system or a control system (not shown), which ensures the removal of surplus oil via an extra outlet (corresponding to for example pipe 7 in FIG. 1). The figure only indicates the principle of the floater system, which can be designed in many known ways, and can comprise weight levers or other conventional techniques for making certain good and reliable operations.

Finally, wave attenuating equipment can be brought into the collector unit 40 in order to prevent a powerful spurting in of oil from leading drops of oil into the pipe 45. Precautions taken at this place can be that the pipe 44 is finished off at the top with a horizontal end party 47, which is closed apart from downward directed slots 48 which ensure that the oil spurt is directed downwards towards the collector unit's base 43. When the oil level in the collector unit is not too low, the spurting out will moreover take place beneath the surface 49 of the oil in the collector unit, and this insures to an even greater degree, against spurt in the direction of the opening towards the pipe 45. This design is also indicated schematically in FIG. 6. In order to stabilize the horizontally directed end portion 47 on the pipe 47 against vibrations, it should be anchored to the collector unit's base 43.

For the prevention of drops of oil spurting into the pipe 45 and thereby mixing in with the gas component, a demister can be inserted above the ending of pipe 44 in the collector unit 40, for example in the form of a saucer-shaped screen or a grate. This is not shown in the figure because the design can vary greatly depending on the overall design of the collector unit and the pipe arrangement.

Further, it should be mentioned that the total volume of the collector unit can advantageously be chosen to be approx. 20% greater than the volume of the greatest anticipated slugs.

It can also be mentioned that the dynamic forces which occur in the arrangement can be substantial and therefore the dimensioning of all supporting structures must be accurate.

I claim:

1. A method for equalizing variations in the density of a fluid flow in a pipeline arrangement, comprising the steps of:

(a) forcing said fluid flow through said pipeline arrangement;

(b) forcing said fluid flow into a flow inducing device providing a flow resistance which increases as the density of said fluid flow increases, said fluid flow passing completely through said flow inducing device when the density of said fluid flow is less than a first density value;

(c) dividing said fluid flow into a first portion and a second portion when the density of said fluid flow reaches a second density value which is greater than said first density value;

(d) storing said first portion in a collection zone, and forcing said second portion through said flow inducing device;

(e) reintroducing said first portion back into said fluid flow prior to entering said flow inducing device when the density of the fluid flow decreases below said first density value.

2. A method according to claim 1, wherein during step (d) said first portion is stored at a vertical level which is higher than a vertical level of said fluid flow.

3. A method according to claim 2, wherein said reintroducing of step (e) is accomplished by the influence of gravity which draws said first portion into said fluid flow.

4. A method according to claim 3, wherein during step (c) said dividing is achieved due to an increase in pressure in said fluid flow upstream from said flow inducing device caused by said flow resistance.

5. A method according to claim 4, wherein said flow inducing device is a vortex chamber.

6. A method according to claim 1, wherein said fluid flow includes at least two fluids of differing densities, the relative proportions of which at any point in time are variable.

7. A method according to claim 6, wherein said fluids are oil and gas.

8. A slug catcher for equalizing variations of density in a fluid flowing in a pipeline arrangement, comprising:

a flow inducing device, through which said fluid flows, providing increased resistance to said fluid flow when the density of said fluid flow increases;

an inlet pipe, through which said fluid flows, connected to said flow inducing device;

a riser pipe connected to said inlet pipe;

a collector unit connected to said riser pipe;

an outlet pipe connected to said flow inducing device;

wherein when the density of said fluid flow is less than a first density value, said fluid flow passes completely through said flow inducing device, and when the density of said fluid flow is at a second density value which is greater than said first density value, said flow inducing device causes an increase in pressure to occur in said inlet pipe forcing a first portion of said fluid flow to enter said collector unit via said riser pipe while a second portion of said fluid flow passes through said flow inducing device and into said outlet pipe, and means for reintroducing said first portion back into said inlet pipe upstream of said flow inducing device when the density of the fluid flow decreases below said first density value.

9. A slug catcher according to claim 8, further comprising an overflow pipe in communication with said collector unit and said outlet pipe.

10. A slug catcher according to claim 9, further comprising a coupling, between the overflow pipe and the outlet pipe, having the form of a T-piece.

11. A slug catcher according to claim 9, further comprise a coupling, between the overflow pipe and the outlet pipe, having the form of a Y-piece.

12. A slug catcher according to claim 8, wherein said flow inducing device is a vortex chamber.

13. A slug catcher according to claim 12, wherein the vortex chamber has a conical design.

14. A slug catcher according to claim 12, wherein the vortex chamber is a bistable type.

15. A slug catcher according to claim 8, wherein the flow inducing device is a valve.

16. A slug catcher according to claim 8, wherein the collector unit is a pressure tank which is mounted vertically above the flow inducing device.

17. A slug catcher according to claim 8, wherein the collector unit is provided with a floater which floats in the first portion of said fluid flow in said collector and prevents the flow of said first portion into the overflow pipe when the amount of said first portion reaches a predetermined level.

18. A slug catcher according to claim 8, further comprising an inlet connecting the riser pipe to the collector unit and being designed as an elongated, horizontally directed pipe with a tight termination and with downwardly directed slots.

* * * * *